United States Patent [19]

Sakauchi et al.

[11] 4,381,472

[45] Apr. 26, 1983

[54] ELECTRONIC TUBES

[75] Inventors: Yoshitada Sakauchi, Mobara; Masayuki Hikiba, Musashino, both of Japan

[73] Assignee: Hitachi, Ltd., Tokyo, Japan

[21] Appl. No.: 174,230

[22] Filed: Jul. 31, 1980

[30] Foreign Application Priority Data

Aug. 1, 1979 [JP] Japan .................................. 54-97265

[51] Int. Cl.³ .............................................. H01J 5/50
[52] U.S. Cl. .................................. 313/331; 174/50.61; 174/50.63; 313/333; 315/39.51
[58] Field of Search ........................ 313/331, 332, 333; 315/39.51; 174/50.61, 50.62, 50.63

[56] References Cited

U.S. PATENT DOCUMENTS

| 2,915,153 | 12/1969 | Hitchcock | 174/50.61 X |
| 3,967,087 | 6/1976 | Kanuma | 315/39.51 |
| 4,163,175 | 7/1979 | Tashiro | 315/39.51 |
| 4,175,245 | 11/1979 | Ishida et al. | 315/39.51 |
| 4,204,138 | 5/1980 | Koinuma et al. | 315/39.51 |
| 4,207,496 | 6/1980 | Nakai | 315/39.51 |

Primary Examiner—Saxfield Chatmon, Jr.
Attorney, Agent, or Firm—Charles E. Pfund

[57] ABSTRACT

In an electronic tube, a metal cylindrical member having, at the end, a cylindrical joint portion is bonded by brazing to the end of ceramic cylindrical member to form a hermetic seal structure. The metal cylindrical member is made of iron and dimensions thereof are specified such that the cylindrical joint portion has a wall thickness of 0.5 mm or less and a height of 1 mm or more.

6 Claims, 7 Drawing Figures

ELECTRONIC TUBES

BACKGROUND OF THE INVENTION

This invention relates to electronic tubes, particularly to an improvement of a hermetic seal structure in an electronic tube assembly wherein alumina ceramic and iron joining components are bonded together by brazing.

Generally, the sealing structure in which alumina ceramic and metal members are bonded together by brazing is widely employed in electronic tubes in order to provide a sufficient insulation between electrodes and also to enhance the bonding strength and durability. FIG. 1 is a partial sectional view of an example of output section of a prior art magnetron in which the joint structure by brazing as mentioned above is employed. In the figure, a copper cylinder 2 which constitutes an antenna and at the same time forms a hermetic sealing section is hermetically bonded to one end of a ceramic cylinder 1 by silver brazing 3a, and to the other end of the ceramic cylinder 1 is bonded a cylinder 4 of Kovar by silver brazing 3b. To the cylinder 4 is bonded on iron cylinder 5 by silver brazing 3c.

Generally, when alumina ceramic member is bonded to a metal member, a molybdenum-based material is heated at a high temperature and sintered onto the joint surface of the alumina ceramic member to form thereon a metal surface. This metal surface is plated with nickel, for example, to provide better fluidity of a brazing material, and to prevent oxidization of the metal surface. For a joint metal member, an Fe-Ni-Co alloy (Kovar) having a thermal expansion coefficient which approximates that of the alumina ceramic is generally used. Another material for the joint metal member is an Fe-Ni alloy (Ferni) which contains Ni by approximately 42%.

Recently, the cost of Co and Ni are increasing rapidly, which in turn results in a cost up of Kovar and Ferni, threatening the production cost. In addition, raw material such as Co is in short supply.

SUMMARY OF THE INVENTION

Accordingly, an object of this invention is to provide an inexpensive electronic tube with a high-quality hermetic sealing structure without using the expensive joint metal member.

Specifically, this invention is directed to an iron joint cylinder which is specified in dimension.

According to this invention, in an electronic tube of the type having a hermetic seal structure in which a metal cylindrical member having at least a cylindrical joint portion at the end is bonded to the end of a ceramic cylindrical member by brazing, the metal cylindrical member is made of iron, and the cylindrical joint portion has a wall thickness of 0.5 mm or less and a height of 1 mm or more.

DESCRIPTION OF THE PREFERRED EMBODIMENTS

Figure 1:
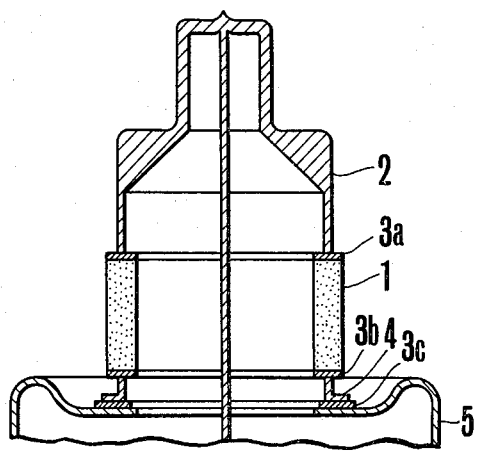
FIG. 1 is a partial sectional view of the output section of a conventional magnetron.
Figure 2:
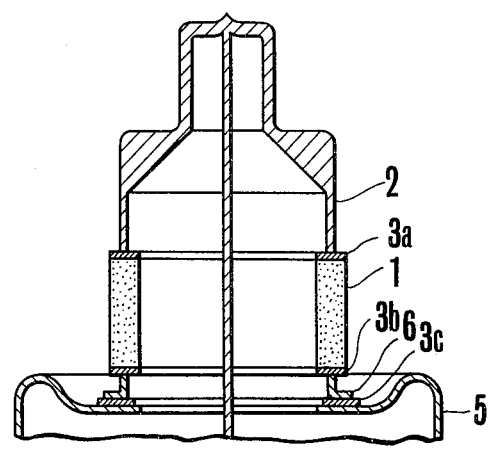
FIG. 2 is a partial sectional view of the output section of a magnetron embodying the present invention.

Referring now to FIG. 2, there is shown an embodiment of the present invention particularly applied to a magnetron. In a hermetic seal structure shown in FIG. 2, a metal cylindrical member 6 made of iron is bonded, at one end, to the bottom end of a ceramic cylindrical member 1 by silver brazing 3b, and an iron cylinder 5 is bonded to the other end of the iron cylindrical member 6 by silver brazing 3c. In other words, the conventional Kovar cylinder 4 shown in FIG. 1 is replaced with the iron cylindrical member 6.

In this structure, the iron cylindrical member 6 can be made integral with the iron cylinder 5 as will be explained later, and the conventional Kovar cylinder 4 and silver brazing 3c in FIG. 1 can be eliminated, thereby dispensing with the expensive joint metal member and reducing cost.

Use of iron instead of Kovar raises a problem that iron has a large thermal expansion coefficient α, a large elasticity coefficient E and a large yield point, so that stress is concentrated at a sealing joint between the iron joint member and the ceramic member, resulting in fracture of the ceramic member. Especially, since a brazing material with a high fusion point is generally used for bonding, a difference between brazing temperature and room temperature is large. Therefore, a large stress concentration is created at the joint at room temperature, thus adversely affecting quality and reliability of the hermetic seal structure.

From this viewpoint, dimensions of the joint between the ceramic member and iron member must be determined appropriately. The reliability of the iron joint member as shown in FIG. 2 was compared with that of the conventional Kovar cylinder 4 in FIG. 1.

Figure 3:
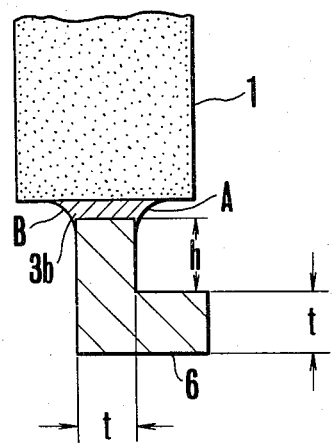
FIG. 3 is an enlarged partial sectional view of the joint sealing structure in FIG. 2.

In FIG. 3 which is an enlarged sectional view of the joint structure of the present invention shown in FIG. 2, tension horizontal stress components are distributed on the outside brazing portion A and compressive horizontal stress components are distributed on the inside brazing portion B at room temperature. In the case of the Kovar cylinder 4 bonded to the ceramic cylinder 1, stress distribution is not localized but is averaged since α of Kovar approximates that of ceramic. On the other hand, in the case of the iron cylinder 6 according to the present invention, the practicability is negated when estimated by a simple stress calculation. However, it does not mean negative immediately, because of the complicated behavior of iron material. According to the present invention, the practicability and reliability evaluation based on experiences was adopted to evaluate the hermetic seal structure.

Evaluation 1

Figure 4:
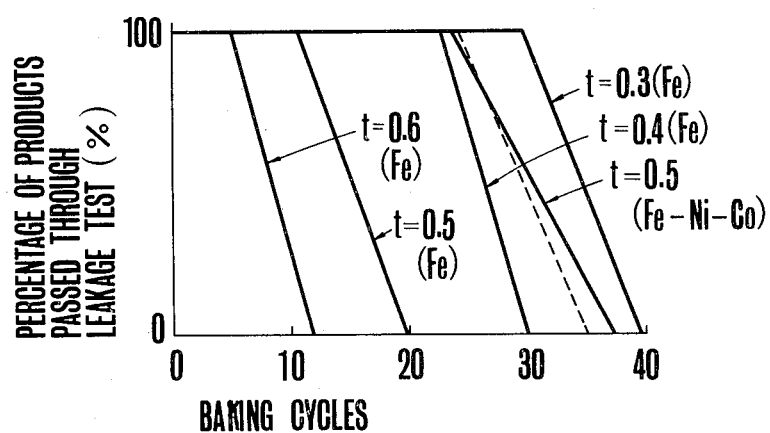
FIG. 4 is a graph showing the relation between percentage of products passed through leakage test and baking cycle under the parameter of the thickness of iron cylindrical member.
Figure 5:
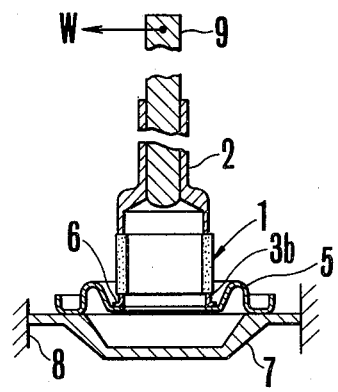
FIG. 5 is a partial sectional view of the output section of the magnetron useful in explaining how to test the bonding strength.

First, samples for the high temperature baking cycle test have the sealing structure in accordance with the present invention as shown in FIG. 2. In manufacture of magnetrons, the hermetic seal structure will experience thermal hysteresis after brazing when it is passed through a process region of approximately 600° C./30 minutes, in which process the joint is most sensitively affected by the stress. Therefore, the vacuum sealing capability of the hermetic joint was examined through a severe heat cycle of 600° C./hour. Examination was made for four iron cylindrical members 6 shown and detailed in FIGS. 2 and 3 and having dimensions of height h=1.0 mm and thicknesses t=0.3, 0.4, 0.5 and 0.6 mm, one iron cylindrical member having dimensions of t=0.5 mm and h=2.5 mm and one Fe-Ni-Co cylinder shown in FIG. 1 having dimensions of t=0.5 mm and h=1.0 mm, so as to check the dependency of sealing capability on the thickness and the kind of material. The test results in FIG. 4 clearly show that the sealing capability depends on the thickness of the joint member, and the same quality (percentage of products passed through leakage test) as that of the conventional Kovar cylinder 4 is achieved by the iron cylinder with a thickness of from 0.3 to 0.4 mm. The iron cylinder with a thickness of 0.3 mm has better quality than that of the conventional Kovar cylinder, and it was found that the limit of the allowable thickness of the iron cylinder is 0.4 mm. The iron cylinders 6 of t=0.5 mm and 0.6 mm have poor quality by less than ½ compared with the conventional Kovar cylinder. But even in the case of a t=0.5 mm iron cylinder, an improved result was obtained as shown at dotted line in FIG. 4 by selecting the h value to more than 2.5 mm according to an experiment.

Evaluation 2

Figure 6:
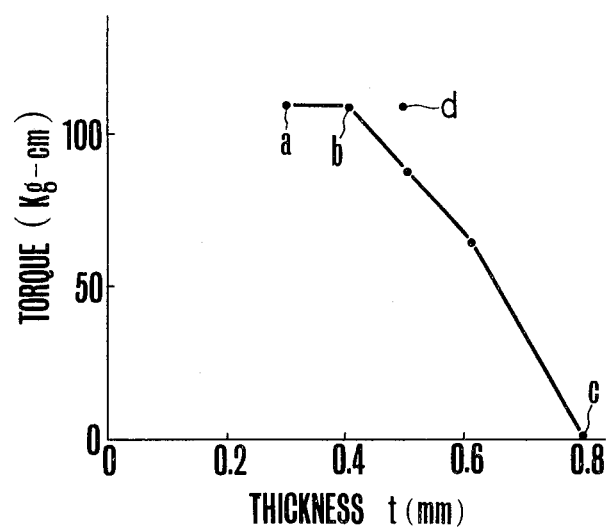
FIG. 6 is a graph showing the relation between applied torque and the thickness of iron cylindrical member.

The strength of the joint was evaluated by measuring the bending torque of the cylinder section assembled in the product. The test is carried out on the iron cylindrical member 6 fixed to the iron cylinder 5 secured to magnet pole piece 7 which in turn is held horizontally by a chuck 8. A core 9 was inserted to a copper cylinder 2 and a force was applied in the W direction to measure the bending torque. FIG. 6 shows the test result. With the thicknesses of t=0.3 mm and 0.4 mm, a torque strength of more than 100 kg-cm was obtained as shown by points a and b without occurrence of leakage, and the same quality as that of the conventional Kovar cylinder 4 could be obtained. On the other hand, with the thickness of t=0.8 mm, the ceramic cylinder 1 was broken after brazing, and the torque strength could not be measured as shown by point c in FIG. 6. In addition, an experimental result is shown at point d in FIG. 6 for an iron cylinder of t=0.5 mm and h=2.5 mm. As will be seen from the figure, this iron cylinder was resistant to a bending torque of 100 Kg-cm or more, showing a comparable quality to the conventional Kovar cylinder.

It is obvious from these results that when the iron cylindrical member 6 is bonded to the alumina ceramic cylinder 1, the quality and reliability of the joint greatly depends on the thickness of the iron cylindrical member 6. It is needless to say that the height (h) of the iron cylindrical member 6 also depends on the thickness. Moreover, the shape of the joint surface of the iron cylindrical member 6 affects the stress distribution, and it is desirable to machine the joint face. These problems can be solved simply by increasing the width of the joining end of the ceramic cylinder 1 and decreasing the thickness of the iron cylindrical member 6, however, change of dimensions is limited by the specification of the product. Therefore, it is necessary to determine the dimensions within the allowable range.

Consequently, substantially the same quality and reliability as those of the conventional Kovar cylinder 4 shown in FIG. 1 can be obtained by the iron cylindrical member 6 having dimensions of t=0.5 mm or less and h=1 mm or more with the ceramic cylinder 1 having a joining end width in the range of from 1.5 to 3 mm. Further enhancement of reliability can be expected when corners of the joint surface of the iron cylindrical member are rounded by radius beveling, spheric beveling or knife edge forming.

Figure 7:
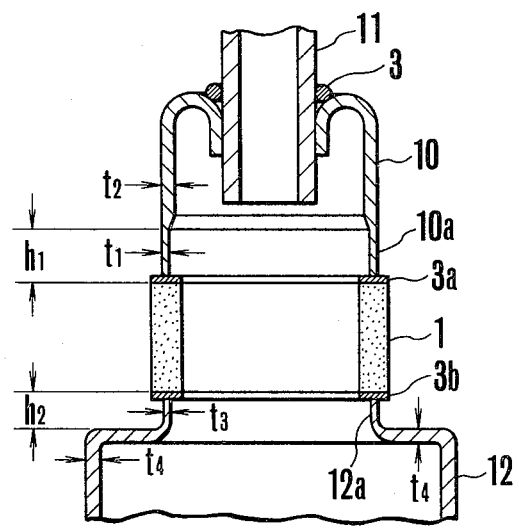
FIG. 7 is a partial sectional view of another embodiment of the present invention showing the output section of an electronic tube, specifically a magnetron.

Turning to FIG. 7, another embodiment of the electronic tube joint structure in accordance with the present invention. In the figure, a first iron cylindrical member 10 is bonded to the upper end of a ceramic cylindrical member 1 by silver brazing 3a. In this embodiment, a cylindrical joint portion 10a of the first iron cylindrical member 10 has a wall thickness t1=0.3 mm and a height h1=3 mm, and merges into the remaining portion having a wall thickness of t2=0.5 mm. A top aperture of the first iron cylindrical member 10 is connected with a copper pipe 11 by silver brazing 3. A second iron cylindrical member 12 is bonded to the lower end of the ceramic cylinder 1 by silver brazing 3b. A joint portion 12a of the second iron cylindrical member 12 has a wall thickness t3=0.3 mm and a height h2=1 mm, and merges into the remaining portion having a thickness t4=0.5 mm.

In this arrangement, the first and second iron cylindrical members 10 and 12 are made with their joint portions 10a and 12a having thickness t1 or t3=0.3 mm, and the remaining portions in continuation to the joint portions are made with thickness t2 and t4=0.5 mm. Consequently, deformation due to the application of external forces in the processing subsequent to brazing can be eliminated; use of copper material can be reduced considerably; use of Kovar material can be eliminated; and assembling steps can be reduced.

As described above, the present invention provides high-quality and high-performance electronic tubes without use of Kovar and Farni materials, which are expensive and difficult to get recently, thus decreasing the production cost.

What is claimed is:

1. In an electronic tube of the type having a hermetic seal structure in which a metal cylindrical member having at least a cylindrical joint portion at the end is bonded to the end of a ceramic cylindrical member by brazing, the improvement of said hermetic seal structure wherein said metal cylindrical member is made of iron, and said cylindrical joint portion has a wall thickness of 0.5 mm or less and a height of 1 mm or more.

2. An electronic tube according to claim 1 wherein said joint portion merges into the remaining portion of iron cylindrical member which has a wall thickness larger than that of the cylindrical joint portion.

3. An electronic tube according to claim 1 or 2 wherein the joint surface of said joint portion to said ceramic cylindrical member is rounded.

4. An electronic tube according to claim 1 wherein the wall thickness of the joint portion is in a range of from 0.3 to 0.4 mm.

5. An electronic tube according to claim 1 wherein the height of the joint portion is in a range of 2.5 mm or more.

6. An electronic tube according to claim 2 wherein the wall thickness of the remaining portion is in a range of from 0.5 to 1.0 mm.

* * * * *

UNITED STATES PATENT AND TRADEMARK OFFICE
CERTIFICATE OF CORRECTION

PATENT NO. : 4,381,472

DATED : April 26, 1983

INVENTOR(S) : Yoshitada Sakauchi and Masayuki Hikiba

It is certified that error appears in the above—identified patent and that said Letters Patent is hereby corrected as shown below:

Col. 1, line 25, change "on" to --an--

Col. 4, line 32, change "t1 or t3" to --t1 and t3--

Signed and Sealed this

Nineteenth Day of July 1983

[SEAL]

Attest:

GERALD J. MOSSINGHOFF

Attesting Officer     Commissioner of Patents and Trademarks